No. 879,367. PATENTED FEB. 18, 1908.
J. H. COOK.
FRICTION TRANSMISSION MECHANISM FOR POWER DRIVEN VEHICLES.
APPLICATION FILED APR. 4, 1907.
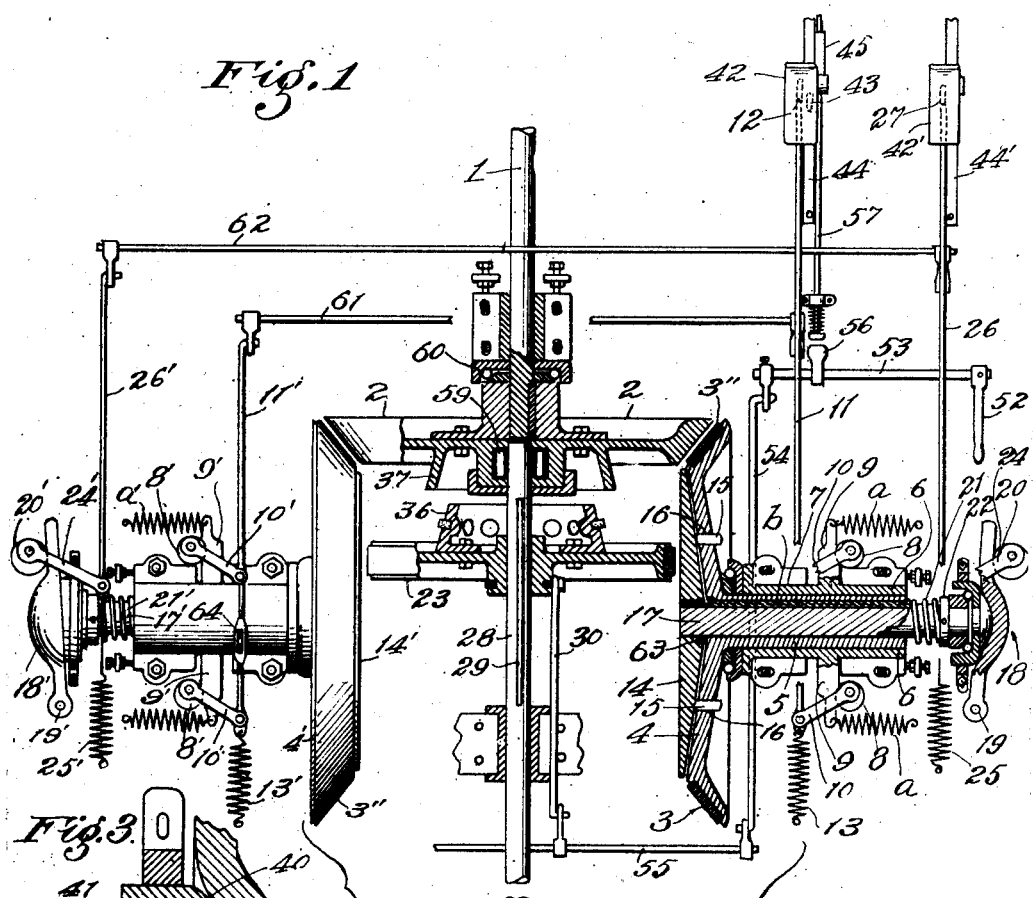
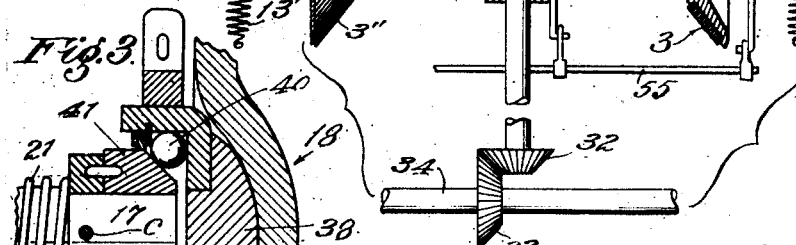
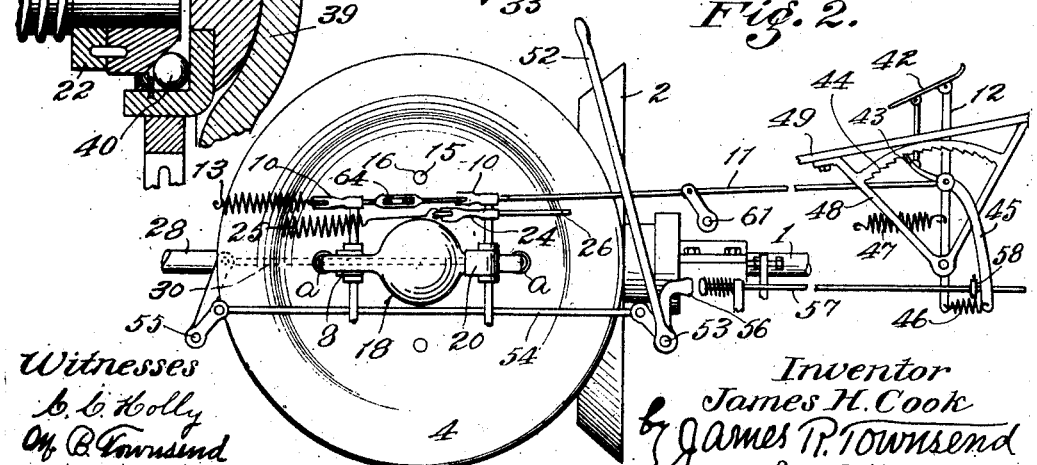
Witnesses
A. C. Holly
O. B. Townsend
Inventor
James H. Cook
by James P. Townsend
his Atty

UNITED STATES PATENT OFFICE.

JAMES H. COOK, OF HOMER, MICHIGAN.

FRICTION TRANSMISSION MECHANISM FOR POWER-DRIVEN VEHICLES.

No. 879,367.  Specification of Letters Patent.  Patented Feb. 18, 1908.

Application filed April 4, 1907. Serial No. 366,450.

*To all whom it may concern:*

Be it known that I, JAMES H. COOK, a citizen of the United States, a resident of Homer, in the county of Calhoun and State of Michigan, temporarily residing at Los Angeles, in the county of Los Angeles and State of California, have invented a new and useful Friction Transmission Mechanism for Power-Driven Vehicles, of which the following is a specification.

This invention relates to that class of power transmission devices in which a disk or its equivalent transmits the power from a driving to a driven wheel.

It is of the objects of this invention to provide means whereby the unequal wearing of the friction surfaces may be compensated for with minimum expense and minimum frequency of repair or replacing of parts; to make provision for accurate adjustment of parts relative to each other, so as to secure the greatest efficiency of transmission; and to provide therewith a bevel friction transmission gear, thereby to increase the efficiency of transmission.

A further object is to provide a ready convenient and effective means for applying direct drive instead of indirect when full speed is employed; also to provide for convenient and ready cutting out of the friction drive and throwing into direct drive when the change to full speed from lower speed is made.

Another object is noiselessness of operation.

Other objects and advantages may appear from the subjoined description.

The invention is applicable to various uses and may be carried out in various ways, and in the accompanying drawings I shall illustrate the form I at present deem most desirable.

The accompanying drawings illustrate the invention as applied for power transmission mechanism for an automobile.

Figure 1 is a fragmental sectional plan of a power transmitting device constructed in accordance with this invention, and mounted in an automoblie or motor car, a fragment of which is shown. The device as shown in this view is provided with oppositely arranged friction disks each being a counterpart of the other and mounted in the same manner, and both detachably connected to be operated from one side of the car by one set of lever and pedal devices. It is to be understood that either disk can be disconnected or dispensed with and the other depended upon alone; the purpose of using two disks being increased efficiency for heavy driving. Fig. 2 is an elevation of the device, looking from the right in Fig. 1. Fig. 3 is a fragmental detail of the thrust bearing of the inner shaft of the friction-disk.

In this invention the friction disk is constructed of outer and inner sections or members which rotate together but which are shiftable into and out of engagement with the driving and driven wheels, respectively, independently of each other.

1 is an engine shaft, to which the driving friction wheel 2 is fixed. The disk which is driven by said driving friction wheel is composed of an outer and an inner section, said sections being movable independently of each other at right angles to the planes of their rotation.

3 is the annular outer frictional face of the outer annular section 4 of the friction disk, which section is mounted on a tubular shaft 5 that is journaled to rotate in a shifting box 6, which is slidably mounted in ways 7 and is slidable in said ways by means of cams 8 acting on box-operating arms 9 that project from the shifting box 6.

10 designates crank arms for the cams 8, the same being connected by power connector 11 to a suitable contrivance as pedal lever 12 accessible to the operator for turning the cams 8 to adjust the box 6 to move the annular friction face 3 toward and from the driving wheel 2.

13, and *a* designate spring means to normally hold the crank arms 10 retracted to withdraw the annular friction face 3 of the transmitting disk out of its engagement with the driving wheel 2.

14 is the inner section of the friction disk, the same being adjustable at right angles to its plane of rotation independently of the annular outer section 4 of said disk. For this purpose said inner section is slidably mounted relative to the outer section 4 by means of guides which may be in the form of a key way and spline *b* or of lugs 15 moving in ways 16; or of both; and is mounted on an inner shaft 17, that extends through and slides longitudinally in the hollow shaft 5 of the outer section 4. The shaft 17 may be shifted endwise by various means. 18 is a shiftable thrust bearing for this purpose, the same being hingedly mounted at 19 and operable by a cam 20 and a spring 21. The latter is carried by and rotates with the shaft 17 and engages the end of the hollow shaft or sleeve 5 and acts on a collar 22 fastened by pin c to the inner shaft 17, whereby the inner friction section 14 is normally retracted relative to the friction rim 4, and withdrawn from the shiftable power receiving and transmitting wheel 23.

24 is a crank arm for the cam 20, the same being held in retracted position by a spring 25.

26 is a connection leading to a suitable contrivance as pedal lever 27 accessible to the operator for controlling the crank arm 24 to operate the thrust bearing 18 and its shaft 17 to move the inner section 14 of the friction disk into engagement with the shiftable power receiving and transmitting wheel 23.

28 is a transmitting shaft on which the power receiving and transmitting wheel 23 is slidably mounted in any suitable way, as by key-way and spline 29.

30 indicates a link constituting a part of the means for shifting the wheel 23 along said shaft 28, thus to bring the wheel 23 into different positions relative to the axis of the transmitting disk for the purpose of reversing and for decreasing the speed of the driven shaft 28, and also for causing engagement of the direct drive clutch hereinafter described.

The means for transmitting power from the driving wheel 2 to the driven wheel 23, may be duplicated as indicated in Fig. 1 of the drawings where the duplicate parts at the left side are marked with characters corresponding to those for like parts already specified, with the addition of an indice; and it is to be understood that the outer and inner sections 4 and 14, and 4' and 14' may be shifted toward and from their respective wheels, independently of each other, by mechanism constructed in any suitable manner, as suggested by the mechanism shown.

The transmitting shaft 28 may be connected by any suitable means, as by bevel gears 32, 33, with the driving axle 34 of the vehicle.

It is to be understood that by the contraction of Fig. 1, the usual universal joints common in automobile transmission shafts are broken out and omitted from the view.

The power-receiving wheel 23 may be connected with the driving-wheel 2 by any suitable form of clutch, as indicated at 36, 37, so that when the wheel 23 is shifted to the highest speed it will be coupled directly with the driving wheel 2 and power will be transmitted directly without the intervention of the friction faces 3, 14. Means hereinafter described are provided for disconnecting the disk-drive when the clutch 36, 37, is in action.

The hinged thrust-bearing 18 may be constructed with a ball-and-socket joint, as indicated at 38, 39, to avoid binding of the parts in the operation of shifting the inner section of the friction disk.

40 designates ball bearings in the socket member of said joint to engage a cone 41 held by collar 22 on the inner shaft 17.

42 designates the pedal for the pedal-lever 12, and 43 a pawl or detent for said pedal lever, the same engaging a segment 44 and provided with a trip-arm 45 normally held in engagement with segment 44 by a spring 46.

47 is a spring to normally retract the pedal-lever 12 which is pivoted to a stationary part 48 below the platform 49 of the motor-car.

The spring 13 connected to retract the cam-arms 10, and the spring a connected with the shfting-box-operating-arms 9 to withdraw the shifting-box 6 and the tubular shaft 5 to release the outer section 4 from the driving-wheel 2, all coöperate with spring 47 to retract the pedal-lever 12.

52 is a lever connected by a rock shaft 53, connecting-rod 54, bell-crank 55, and link 30, for shifting the driven friction wheel 23 on the shaft 28.

The rock-shaft 53 is provided with an arm 56 to engage a knockout 57 which extends forward to the trip-arm 45, and is provided with a collar 58 that is adjustable therealong to engage the trip-arm 45 of the pawl 43 to release the pawl from the segment whenever the lever 52 is thrown forward almost but not quite far enough to cause the clutch member 36 to engage the clutch member 37. The end of shaft 28 is journaled by roller bearings 59 in the driving wheel 2, thus to give said shaft a firm and rigid support.

60 designates a thrust - bearing for the driving-wheel 2. The driving-wheel and the friction-rim 4 are preferably in the form of bevel wheels, thereby avoiding the slippage that accompanies the transmission from a straight-faced wheel to a plain-faced disk. The connecting-rod 26 is connected with a pedal-lever 27 which is controlled by a pedal 42' and is held by a pawl 43' and segment 44', substantially like corresponding parts shown in the side elevation in Fig. 2.

The power connectors 11 and 11' may be connected by rock-shaft 61 for simultaneous operation by pedal 42, and power connectors 26 and 26' may be connected by rock-shaft 62 for simultaneous operation by pedal 42' so that the operation of the mechanism on both sides will be alike according to the position of either or both pedals.

In practical use, the friction-disk may be disconnected from the driving and driven wheels by simply releasing the pedals and allowing the springs to operate to withdraw the friction-disk from the driving and driven wheels, thus leaving the engine to run free. It is not necessary, however, that the outer rim of friction-wheel 4 be disconnected from the engine when the same is started or while it is running.

In practice the operator may throw the mechanism into and out of action by operating the lever and pedals.

The friction rim 3 may be brought into engagement with the driving wheel 2 by operating the pedal lever 12, thus causing both sections of the disk to rotate; and then, the wheel 23 being brought to the appropriate position relative to the inner section 14 of the disk,—say at low speed either forward or reverse,—the pedal lever 27 may be operated to turn the cam 20, thus shifting the shaft 17 endwise and bringing the inner member 14 of the disk into engagement with the driven wheel 23. When it is desired to change the speed or to reverse the arm, it is not necessary that the rotation of the disk be interfered with, for all that is required is to simply retract the inner section of the disk, then, by means of lever 52, shift the wheel 23, and then bring section 14 back into engagement with wheel 23. This mode of operation effects a considerable saving of power over what would be required if the friction disk had to be stopped and started each time the speed or direction of the car is changed; and such saving is made possible by the construction of the friction disk in two sections and providing manual means for operating the movable section. Not only is this saving effected, but rapid changing of speed is also facilitated by the construction described.

The outer friction rim may be inlaid with a fiber body 3'' to engage the metal driving wheel 2 thus minimizing liability of slippage. The application of fiber in this connection also avoids metallic sounds of contact between the driving wheel and the disk.

63 is a fiber washer between the sections 4 and 14 of the friction disk to avoid metallic sound that might otherwise occur upon retraction of the inner section.

The cam arms 10 and 10' are connected by adjustable means, as indicated at the left side of Fig. 1, where turn-buckles 64 are shown for this purpose, so that said cams may be adjusted to act simultaneously to shift the outer shaft.

What I claim is:—

1. Friction transmission mechanism comprising a friction disk constructed in two sections, each of said sections being movable independently of the other at right angles to its plane of rotation.

2. Friction transmission mechanism comprising a driving wheel, a driven wheel, a friction disk composed of two sections connected to rotate together and means for moving said sections independently of each other at right angles to the planes of their rotation.

3. A friction transmission disk comprising two independently shiftable sections.

4. A driving wheel, a driven wheel, a disk comprising two independently shiftable sections connected to rotate together and lever and cam means for shifting said sections independently of each other into engagement with said wheels respectively, and spring means to retract said sections.

5. A flat faced wheel, a bevel wheel, an annular disk section having a bevel rim to engage the bevel wheel and also having a hollow shaft, a disk section having a flat face to engage the flat faced wheel and also having a shaft slidable in and rotatable with said hollow shaft, means to shift one of said shafts endwise, and means to shift the other shaft endwise.

6. Two wheels, an annular disk section to engage one of said wheels, and having a hollow shaft, a disk section having a flat face to engage the other wheel and also having a shaft slidable in and rotatable with said hollow shaft, means to shift one of said shafts endwise, and means to shift the other shaft endwise.

7. A transmission disk comprising an outer and an inner section, the one having a hollow shaft and the other having a shaft inside the hollow shaft and rotatable therewith, means for shifting one of said shafts endwise, and means for shifting the other shaft endwise.

8. A transmission disk comprising an outer and an inner section, the one having a hollow shaft and the other having a shaft inside the hollow shaft and rotatable therewith, a thrust bearing for the inner shaft, means to move said bearing to shift said shaft, means to retract said bearing and shaft, a shiftable box for the hollow shaft, means to shift said box and said hollow shaft, and means to retract said box and shaft.

9. Two transmission wheels, a disk comprising two independently shiftable sections connected to rotate together, clutch means to connect said wheels, means to hold one of said disk sections in engagement with one of said wheels, means to hold the other disk section in engagement with the other of said wheels, and means to disengage the disk sections from the wheels when the clutch means are engaged.

10. A driving wheel, a driven wheel, a disk comprising two sections connected to rotate together, and lever and cam means for shifting one of said sections independently of the other, and spring means to retract said section.

11. Two wheels, an annular disk section to engage one of said wheels and having a hollow shaft; a disk section having a flat-face to engage the other wheel and also having a shaft in said hollow shaft, means to yieldingly hold the disk engaged and manual means to shift one of said shafts endwise relative to the other.

12. A transmission disk comprising an outer and an inner section, one having a hollow shaft, and the other having a shaft inside the hollow shaft and rotatable therewith, yielding means for shifting one of said shafts endwise relative to the other and manual means for so shifting said shaft.

13. A transmission disk comprising an outer and an inner section, the one having a hollow shaft and the other having a shaft inside the hollow shaft and rotatable therewith, a thrust bearing for the inner shaft, means to move said bearing to shift said shaft, and means to retract said bearing and shaft relative to the other shaft.

14. Two transmission wheels, a disk comprising two sections connected to rotate together, clutch means to connect said wheels, means to hold one of said disk sections in engagement with one of said wheels, means to shift the other disk section into and out of engagement with the other of said wheels, and means to disengage said disk section from its wheel when the clutch means are engaged.

15. Friction transmission mechanism having a transmission wheel and a friction disk composed of two parts, one serving as a driver for the other part, and said other part being adjustable toward and from said transmission wheel, and manual means for such adjustment.

In testimony whereof, I have hereunto set my hand at Los Angeles California this 23d day of March 1907.

JAMES H. COOK.

Witnesses:
 JAMES R. TOWNSEND,
 M. BEULAH TOWNSEND.